United States Patent [19]  [11] Patent Number: 4,872,587
Zimmermann et al.  [45] Date of Patent: Oct. 10, 1989

[54] CLOSURE FOR A FUEL TANK

[75] Inventors: Günther Zimmermann; Reinhard Friedrich, both of Waiblingen; Wolfgang Nantt, Steinheim; Wolfgang Weissert, Leutenbach, all of Fed. Rep. of Germany

[73] Assignee: Andreas Stihl, Waiblingen, Fed. Rep. of Germany

[21] Appl. No.: 216,203

[22] Filed: Jul. 7, 1988

[30] Foreign Application Priority Data

Jul. 24, 1987 [DE] Fed. Rep. of Germany ... 8710127[U]

[51] Int. Cl.⁴ .............................................. B65D 55/16
[52] U.S. Cl. .................................................. 220/375
[58] Field of Search .................. 220/85 CH, 249, 250, 220/251, 375, DIG. 33

[56] References Cited

U.S. PATENT DOCUMENTS

| 1,408,082 | 2/1922 | Dowler | 220/375 |
| 1,450,077 | 3/1923 | Haas | 220/375 |
| 1,471,071 | 10/1923 | Smith | 220/375 |
| 1,543,256 | 6/1925 | Grant | 220/375 X |
| 1,711,287 | 4/1929 | Schlaich | 220/375 X |
| 1,735,132 | 11/1929 | Schlaich | 220/375 X |
| 4,106,664 | 8/1978 | Renk et al. | 220/375 X |
| 4,113,138 | 9/1978 | Fields et al. | 220/375 X |
| 4,467,937 | 8/1984 | Shaw | 220/DIG. 33 X |
| 4,705,190 | 11/1987 | Mizusawa | 220/375 |

FOREIGN PATENT DOCUMENTS

| 1253868 | 1/1961 | France | 220/375 |
| 2580595 | 10/1986 | France | 220/375 |

Primary Examiner—Stephen Marcus
Assistant Examiner—Nova Stucker
Attorney, Agent, or Firm—Walter Ottesen

[57] ABSTRACT

A threaded closure is provided with a receiving opening 16 in the part thereof which projects into a fuel tank. The end of a limp connecting part 13 is rotatably mounted in this recess and is however axially fixed. The threaded closure prevents damage to the sealing surface and prevents the threaded closure from becoming separated from the fuel tank so that it cannot be lost.

18 Claims, 1 Drawing Sheet

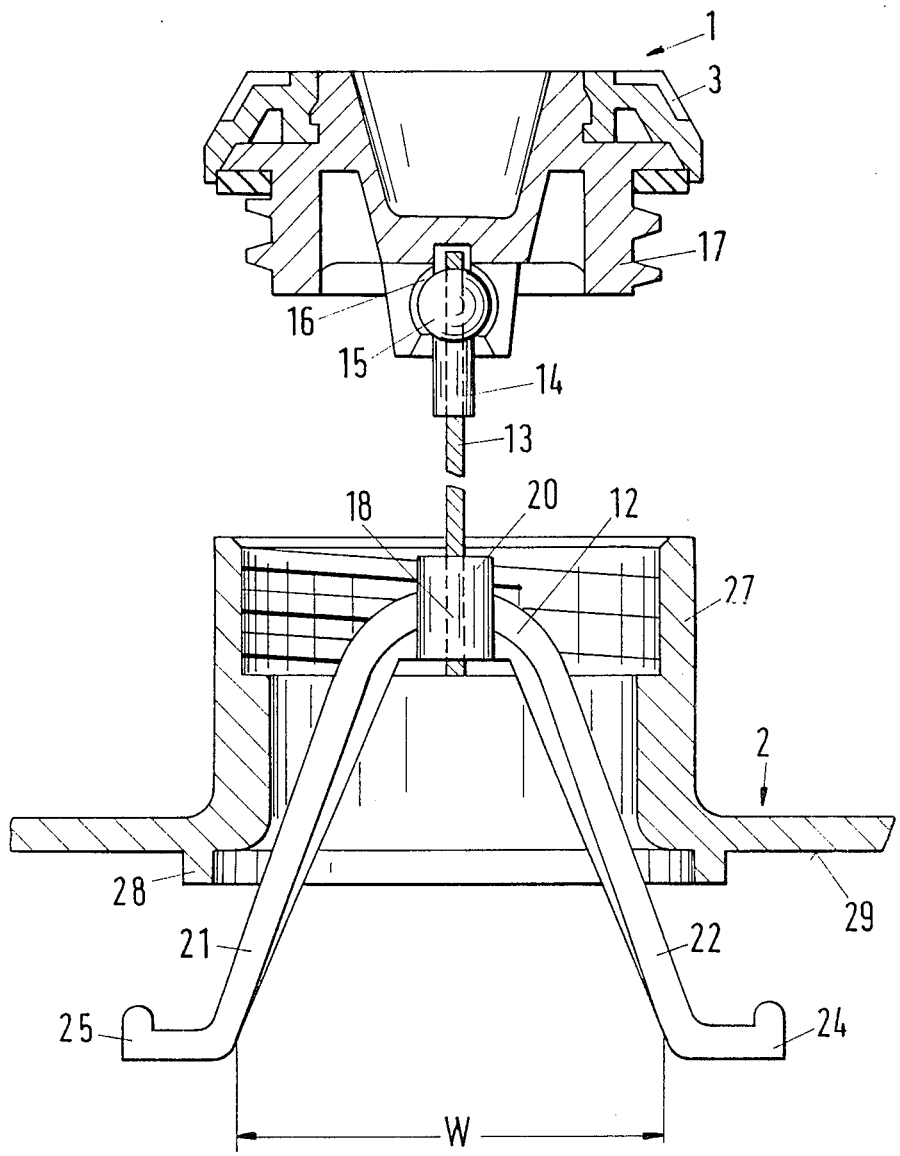

CLOSURE FOR A FUEL TANK

FIELD OF THE INVENTION

The invention relates to a threaded closure for a fuel tank such as for a portable tool such as a chain saw driven by an internal combustion engine.

BACKGROUND OF THE INVENTION

In known threaded closures for fuel tanks, the threaded part of the closure which projects into the fuel tank is provided with a holding lug to which a metal chain is attached. This metal chain has a free end on which an approximately X-shaped part is provided which is intended to hold the threaded closure to prevent the same from becoming lost when threadably disengaged from the fuel tank.

This metal chain often leads to a damaging of the sealing surface at the edge of the filling stub of the tank because of the friction of this chain against this edge. Thus, the chain is often clamped between the closure and the inlet stub when the threaded closure is not properly placed upon this stub. Furthermore, the known hook portion which has an approximately X-shaped configuration does not assure a reliable attachment against becoming loose because this hook-shaped part yields especially when pulling forces are applied to the threadably disengaged closure with the result that the closure and chain becomes lost.

SUMMARY OF THE INVENTION

It is an object of the invention to improve the known threaded closure so that damage to the sealing surface is avoided. It is a further object of the invention to provide a threaded closure which is secure against loss.

The closure of the invention can be utilized for the fuel tank of a handheld portable tool such as a motor-driven chain saw. The tank has an opening defined by a sealing surface about the periphery thereof. The closure includes: a cap having an upper grip portion at which the cap can be grasped by an operator. The cap also has a lower portion extending downwardly from the grip portion for projecting into the tank when the cap is placed on the opening. The closure further includes a limp connecting member for connecting the cap with the tank, the connecting member defining an axis and having first and second ends; and, attachment means for attaching the connecting member at the first end thereof to the lower portion of the cap so as to permit the connecting member to rotate completely with respect to the lower portion while at the same time axially fixing the connecting member with respect to the lower portion.

According to a feature of the invention, a limp connecting part is provided for connecting the threaded closure with the elastic yielding hook part for the purpose of securing the closure against loss and against becoming dirty. The connecting member can, for example, be in the form of a cord or a band made of a material resistant to fuel. The connecting part can, for example, be made of a plastic available commercially under the trade name POLYAMID 6.

It is advantageous that one end of the limp plastic connecting part is provided with a sphere also made of plastic and which is rotationally movable and is, however, axially fixed in a recess formed in the part of the threaded closure projecting into the tank.

The above-mentioned objects of the invention can also be realized pursuant to another feature of the invention which provides for a V-shaped resilient hook member which is connected to the other end of the limp connecting part. The ends of the spreading legs of this hook part extend into bent-over barb-like anchors to ensure a reliable hooking in the fuel tank.

For introducing the V-shaped hook member into the fuel tank, the hook member is pressed together to such an extent that it can be pushed through the filling stub into the interior of the tank. The V-shaped hook member again resiliently spreads after passing the inner end of the filling stub so that the projecting parts lie as anchors against the inner wall of the fuel tank and are freely rotatable with the closure or hang freely in the tank when the closure is seated on the filling stub.

BRIEF DESCRIPTION OF THE DRAWING

The single FIGURE of the drawing is a side elevation view, partially in section, of a complete threaded closure shown with the V-shaped hook member within the fuel tank.

DESCRIPTION OF THE PREFERRED EMBODIMENTS OF THE INVENTION

The threaded closure 1 includes a cap 3 arranged outside of the fuel tank 2 and has the shape of a truncated cone.

A resilient hook member 12 is provided to establish a non-separating connection of the threaded closure 1 with the fuel tank 2. The hook member 12 is permanently connected with a cap 3 via a limp connecting part 13 having end 14 connected to the lower portion 17 of the cap. The end 14 of connecting part 13 is provided with a sphere 15 which is seated in recess 16 of the lower portion 17 of the cap 3 which projects into the interior of the fuel tank 2. The sphere 15 is rotatable but is seated in the recess 16 so as to be axially fixed.

The other end 18 of the limp connecting part 13 is inseparably attached in a sleeve 20 of the V-shaped hook member 12. The two legs (21, 22) of the hook member 12 are connected with the sleeve 20 and form the V-shaped configuration when viewed from the sleeve 20. The ends of the spread legs (21, 22) have bent-over end segments which define respective short barb-like anchors (24, 25).

To establish a non-separating connection of the threaded closure 1 with the fuel tank 2, the resilient V-shaped hook member is pressed together to such an extent that both anchor ends (24, 25) can be inserted through the filling stub 27 of the fuel tank 2. After the two anchors (24, 25) are effectively released in the interior of the container, the legs (21, 22) lie on the edge 28 between the filling stub 27 and the inner wall 29 of the fuel container 2 and thereby reliably prevent a dirtying or loss of the threaded closure.

The offset end segments (24, 25) have a length corresponding to approximately one-quarter of the maximum opening width of the legs.

The limp connecting member 13 is preferably made of plastic which is commercially available under the trade name POLYAMID 6. It is advantageous if the plastic connecting part 13, the sphere 15 and the member 12 with the sleeve 20 through which the connecting part extends are all made as a single plastic member.

It is understood that the foregoing description is that of the preferred embodiments of the invention and that various changes and modifications may be made thereto without departing from the spirit and scope of the invention as defined in the appended claims.

What is claimed is:

1. A closure for a tank such as the fuel tank of a hand-held portable tool such as a motor-driven chain saw, the closure comprising:

a filling stub defining a longitudinal axis and being formed on the tank and defining an opening having a sealing surface about the periphery thereof;

a cap for coacting with said sealing surface to close the tank in a seal-tight manner, said cap including an upper grip portion for manually gripping and rotating the cap to remove the same from said filling stub, the cap also having a lower portion extending downwardly from said grip portion for projecting into said filling stub when said cap is placed on said opening;

a completely limp non-metal connecting member for connecting said cap with the tank, said connecting member defining an axis and having first and second ends;

holding means for preventing said connecting member and said cap from being separated from the tank after the cap has been removed from said opening;

said connecting member being made of fuel resistant plastic so as not to scratch said sealing surface during the time that said cap is removed from said opening thereby protecting said sealing surface from damage which could affect the integrity thereof;

attachment means for loosely attaching said connecting member at said second end thereof to said lower portion of said cap;

said attachment means including a spherically shaped recess formed in said lower portion; a ball attached to said first end of said connecting member and being journalled in said recess with play so as to permit free movement of said ball in said recess in the manner of a socket joint while at the same time being fixed with respect to movement along said axis;

said tank having a tank wall defining an inner wall surface in the vicinity of said filling stub; and, said holding means including a V-shaped resilient hook attached to said second end of said connecting member, said resilient hook having two legs defining the V-shape thereof, each of said legs having an offset end segment which comes into contact arresting engagement with said inner wall when the cap is removed from the opening of said inlet stub thereby preventing said cap and said connecting member from becoming completely detached from the tank when the cap is removed from said inlet stub.

2. The closure of claim 1, said connecting member comprising a cord made of a material resistant to fuel.

3. The closure of claim 1, said connecting member comprising a band made of a material resistant to fuel.

4. The closure of claim 1, said V-shaped resilient hook being configured so as to permit said legs thereof to be elastically pressed together thereby enabling said hook together with the offset end segments thereof to clear and be passed through said opening and into said tank.

5. The closure of claim 4, said holding means further including a peripheral edge projection formed on said inner wall surface for engaging the offset end segments of said legs, respectively, thereby preventing said cap from becoming completely separated from said tank when the cap is removed from said inlet stub.

6. The closure of claim 4, said V-shaped resilient hook having a mid portion whereat said two legs are joined to each other; said second end of said limp connecting member being connected to said resilient hook at said mid portion; said hook including a sleeve at said mid portion for receiving said second end therein for attaching said connecting member to said hook, and, said hook, said sleeve, said connecting member and said ball all conjointly defining a single piece made of plastic.

7. A closure for a tank such as the fuel tank of a hand-held portable tool such as a motor-driven chain saw, the closure comprising:

a filling stub formed on the tank and defining an opening;

a cap including an upper grip portion for manually gripping and rotating the cap to remove the same from said filling stub, the cap also having a lower portion extending downwardly from said grip portion for projecting into the opening when said cap is placed on said filling stub;

a completely limp non-metal connecting member for connecting said cap with the tank, said connecting member defining an axis and having first and second ends;

holding means for preventing said connecting member and said cap from being separated from the tank after the cap has been removed from said opening;

attachment means for loosely attaching said connecting member at said first end thereof to said lower portion;

said lower portion and said first end conjointly defining a predetermined clearance space therebetween to permit said cap to rotate completely and effortlessly relative to said connecting member while at the same time axially fixing said connecting member to said lower portion; and, said holding means including a V-shaped resilient hook attached to said second end, said resilient hook having two legs defining the V-shape thereof, each of said legs having an offset end segment defining a barb-like anchor; and, catch means formed on said inner wall for engaging said barb-like anchor of each of said legs when the cap is removed from the opening of the tank thereby preventing said cap and said connecting member from becoming completely detached from the tank when the cap is removed from said opening.

8. The closure of claim 7, said opening of said filling stub having a predetermined diameter; and, said legs defining a maximum opening width (W) at the offset end segments approximately equal to said diameter.

9. The closure of claim 8, said offset end segments having a length corresponding to approximately one-quarter of said maximum opening width of said legs.

10. The closure of claim 8, said V-shaped hook and said connecting member being configured as a single piece made of plastic.

11. The closure of claim 7, said V-shaped resilient hook having a mid portion whereat said two legs are joined to each other; said second end of said limp connecting member being connected to said resilient hook at said mid portion; said hook including a sleeve at said mid portion receiving said second end therein for non-separably attaching said connecting member to said hook.

12. A closure for a tank such as the fuel tank of a handheld portable tool such as a motor-driven chain saw, the closure comprising:
   a filling stub defining a longitudinal axis and being formed on the tank and defining an opening;
   a cap including an upper grip portion for manually gripping the cap to remove the same from said filling stub, the cap also having a lower portion extending downwardly from said grip portion for projecting into said filling stub when said cap is placed on said opening;
   a limp non-metal connecting member for connecting said cap with the tank, said connecting member defining an axis and having first and second ends;
   holding means for preventing said cap from being separated from the tank after the cap has been removed from said opening;
   attachment means for attaching said connecting member at said second end to said lower portion;
   said tank having a tank wall defining an inside wall surface in the vicinity of said filling stub; and,
   said holding means including: catch means formed on the inside wall surface of said tank wall at said opening; and, a V-shaped resilient hook member attached to said first end of said connecting member, said resilient hook member having two legs defining the V-shape thereof, each of said legs having an offset end segment defining a barb-like anchor for engaging said catch means when said cap is removed from said opening thereby preventing said cap and said connecting member from becoming completely detached from the tank when the cap is removed from said opening.

13. The closure of claim 12, said tank having a filling stub formed thereon for accommodating said cap thereon, said filling stub having an upper edge defining said seal and having an opening of a predetermined diameter; and, said legs defining a maximum opening width (W) at the offset end segments approximately equal to said diameter.

14. The closure of claim 12, said offset end segments having a length corresponding to approximately one-quarter of said maximum opening width of said legs.

15. The closure of claim 12, said V-shaped hook and said connecting member being configured as a single piece made of plastic.

16. The closure of claim 12, said V-shaped resilient hook having a mid portion whereat said two legs are joined to each other; said second end of said limp connecting member being connected to said resilient hook at said mid portion; said hook including a sleeve at said mid portion receiving said second end therein for non-separably attaching said connecting member to said hook.

17. A closure for a tank such as the fuel tank of a handheld portable tool such as a motor-driven chain saw, the closure comprising:
   a filling stub defining a longitudinal axis and being formed on the tank and defining an opening;
   a cap including an upper grip portion for manually gripping the cap to remove the same from said filling stub, the cap also having a lower portion extending downwardly from said grip portion for projecting into said filling stub when said cap is placed on said opening;
   a connecting member for connecting said cap with the tank, said connecting member defining an axis and having first and second ends;
   holding means for preventing said cap from being separated from the tank after the cap has been removed from said opening;
   attachment means for attaching said connecting member at said second end to said lower portion;
   said tank having a tank wall defining an inside wall surface in the vicinity of said filling stub; and,
   said holding means including: catch means formed on the inside wall surface of said tank wall at said opening; and, a V-shaped resilient hook member attached to said first end of said connecting member, said resilient hook member having two legs defining the V-shape thereof, each of said legs having an offset end segment defining a barb-like anchor for engaging said catch means when said cap is removed from said opening thereby preventing said cap and said connecting member from becoming completely detached from the tank when the cap is removed from said opening.

18. The closure of claim 17, said tank having a filling stub formed thereon for accommodating said cap thereon, said filling stub having an upper edge defining said seal and having an opening of a predetermined diameter; and, said legs defining a maximum opening width (W) at the offset end segments approximately equal to said diameter.

* * * * *